United States Patent Office 2,843,574
Patented July 15, 1958

2,843,574

COPOLYMERS OF VINYLIDENE CHLORIDE AND LONG-CHAIN ALKYL ACRYLATES

Edmund F. Jordan, Philadelphia, and William S. Port, Plymouth Valley, Norristown, Pa., assignors to the United States of America as represented by the Secretary of Agriculture No Drawing. Application July 11, 1956
Serial No. 597,307

2 Claims. (Cl. 260—86.3)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

Vinylidene chloride when polymerized alone yields an intractable polymer of little or no practical utility. Its copolymerization with various other polymerizable vinyl type monomers frequently yields more workable products, though the use of external softeners or plasticizers is still generally necessary.

An object of this invention is to provide novel copolymers of vinylidene chloride and long-chain alkyl acrylates having the desirable properties of being internally plasticized and, in particular, of having improved low temperature flexibility.

According to the invention, vinylidene chloride is copolymerized with an alkyl acrylate having 16 to 18 carbon atoms in the alkyl group to yield copolymers that vary from rigid plastics to soft, flexible, elastic materials, depending on the relative proportion in which the monomers are copolymerized. These copolymers are characterized by ease of milling, molding, extrusion or other processing and by being internally plasticized, and thus inherently tough and flexible. The proportions in which the two monomers are copolymerized may be varied widely, depending on the properties desired in the copolymers. While useful products are obtained by copolymerizing from about 15% to about 40% by weight of hexadecyl or octadecyl acrylate with vinylidene chloride, we prefer those copolymers containing about 20 to 35% of the long-chain alkyl acrylate.

We have found that the ratio of vinylidene chloride to alkyl acrylate in the copolymers is substantially the same as in the monomer mixture from which the polymers were made, indicating that the two monomers have similar reactivities.

The following examples illustrate the production of our copolymers:

EXAMPLE 1

A mixture composed of 30 g. octadecyl acrylate, 170 g. vinylidene chloride, 0.6702 g. benzoyl peroxide, 6 g. magnesium carbonate and 400 ml. of a 0.5% aqueous polyvinyl alcohol solution was placed into a crown-capped bottle, the air flushed out with nitrogen and the bottle was capped. The bottle was rotated and heated at 50° C. for 48 hours. The bottle was opened and the contents filtered. The copolymer was washed with water to remove the adhering polyvinyl alcohol. The copolymer was treated with 10% sulfuric acid to dissolve the magnesium carbonate, was filtered and was extracted five times with refluxing methanol to remove monomeric octadecyl acrylate. The copolymer when dried weighed 131 g. Analysis showed that the copolymer contained 15.9% octadecyl acrylate.

Copolymers of other alkyl acrylates and vinylidene chloride are readily prepared by the procedure of Example 1, the octadecyl acrylate merely being replaced with any desired alkyl acrylate.

Table I shows some of the properties of copolymers of vinylidene chloride and octadecyl acrylate and contrasts them with similar copolymers of butyl and octyl acrylate. The hexadecyl acrylate copolymers are not shown because they are substantially identical with the corresponding octadecyl acrylate copolymers. Dodecyl acrylate copolymers are more similar to those made from octyl acrylate while tetradecyl acrylate copolymers are intermediate between the dodecyl and the hexadecyl acrylate copolymers.

In Table I is shown the weight percent of acrylate in the copolymer, its tensile properties, its brittle point or apparent second-order transition temperature, as determined by the procedure of Clash and Berg [Modern Plastics, 21, No. 11, 119 (1944)] procedure, and its milling temperature. For practical use, the resins should have a tensile strength of at least about 1000 lbs./sq. in., a milling temperature in the range of about 50 to 150° C. and a brittle temperature below about 0° C.

Table I.—*Properties of copolymers of vinylidene chloride and alkyl acrylates*

| Ex. No. | Acrylate, percent | Tensile Strength, lbs./sq. in. | Elongation, percent | 100% Modulus, percent | Brittle Temp., Clash-Berg, °C. | Milling Temp., °C. |
|---|---|---|---|---|---|---|
| 2 | octadecyl, 9.4 | | | | | decomposed |
| 3 | octadecyl, 15.9 | 4,060 | 110 | 3,950 | −7 | 155 |
| 4 | octadecyl, 23.6 | 2,250 | 425 | 2,080 | −11 | 145 |
| 5 | octadecyl, 31.0 | 1,700 | 500 | 1,595 | −16 | 120 |
| 6 | octadecyl, 33.9 | 1,320 | 500 | 1,190 | −18 | 70 |
| 7 | octadecyl, 39.0 | 900 | 430 | 770 | −22 | 45 |
| 8 | octyl, 9.1 | 3,750 | 140 | | | 155 |
| 9 | octyl, 17.6 | 1,820 | 480 | 1,740 | −4 | 110 |
| 10 | octyl, 25.4 | 715 | 500 | 550 | −12 | 65 |
| 11 | butyl, 9.8 | 2,600 | 45 | | +13 | 150 |
| 12 | butyl, 15.9 | 1,930 | 200 | 1,860 | +7 | 120 |
| 13 | butyl, 19.4 | 930 | 400 | 600 | +2 | 65 |
| 14 | butyl, 27.2 | 590 | 500 | 340 | −2 | 55 |

The copolymers of the invention may be prepared by any conventional process for the polymerization of the respective monomers, such as in aqueous emulsion or suspension, in solution in an organic solvent or in bulk. The polymerization may be catalyzed by the usual free radical generating catalysts, such as peroxides, persalts, peracids, ultra-violet light, heat, etc.

It is known that in the homologous series of n-alkyl polyacrylates the octyl polyester has the lowest brittle point while the hexadecyl and octadecyl polyesters have much higher brittle points. From this, it might have been expected that the octyl ester would be most effective in lowering the brittle point of the vinylidene chloride-acrylate copolymers. As may be seen from the data in Table I, however, the octadecyl ester is far more effective than the octyl ester.

Copolymers of vinylidene chloride and hexadecyl or octadecyl acrylate or a mixture of the two acrylates wherein the acrylate content is in the range of about 15 to 40% are strong, tough, flexible plastics that require no external plasticizer for fabrication and use.

We claim:
1. A copolymer of vinylidene chloride and an alkyl acrylate, said acrylate having 16 to 18 carbon atoms in the alkyl group and constituting about 15 to 40% by weight of the copolymer.
2. A copolymer as in claim 1 wherein the alkyl acrylate is octadecyl acrylate.

References Cited in the file of this patent

UNITED STATES PATENTS

| | | |
|---|---|---|
| 2,160,945 | Wiley | June 6, 1939 |
| 2,810,715 | Jordan | Oct. 22, 1957 |

FOREIGN PATENTS

| | | |
|---|---|---|
| 524,975 | Great Britain | Aug. 19, 1940 |

OTHER REFERENCES

Schildnecht: "Vinyl and Related Polymers," page 230 (1952).